US010005149B2

(12) United States Patent
Arai et al.

(10) Patent No.: US 10,005,149 B2
(45) Date of Patent: Jun. 26, 2018

(54) CAPACITOR-TYPE WELDING DEVICE AND CAPACITOR-TYPE WELDING METHOD

(71) Applicant: ORIGIN ELECTRIC COMPANY, LIMITED, Saitama-shi, Saitama (JP)

(72) Inventors: Kouji Arai, Saitama (JP); Yasuo Kadoya, Saitama (JP); Akio Komatsu, Saitama (JP)

(73) Assignee: ORIGIN ELECTRIC COMPANY, LIMITED, Saitama-shi, Saitama (JP)

( * ) Notice: Subject to any disclaimer, the term of this patent is extended or adjusted under 35 U.S.C. 154(b) by 684 days.

(21) Appl. No.: 14/376,593

(22) PCT Filed: Jan. 24, 2013

(86) PCT No.: PCT/JP2013/051455
§ 371 (c)(1),
(2) Date: Aug. 4, 2014

(87) PCT Pub. No.: WO2013/118588
PCT Pub. Date: Aug. 15, 2013

(65) Prior Publication Data
US 2014/0374389 A1  Dec. 25, 2014

(30) Foreign Application Priority Data

Feb. 7, 2012  (JP) .................... 2012-024268

(51) Int. Cl.
*B23K 11/26* (2006.01)
*B23K 11/11* (2006.01)
(Continued)

(52) U.S. Cl.
CPC ............ *B23K 11/26* (2013.01); *B23K 11/115* (2013.01); *B23K 11/245* (2013.01); *B23K 2201/18* (2013.01); *H02M 1/32* (2013.01)

(58) Field of Classification Search
CPC ...... B23K 11/26; B23K 11/115; B23K 11/245
(Continued)

(56) References Cited

U.S. PATENT DOCUMENTS 3,611,103 A * 10/1971 Ayers .................. H03K 3/55
219/113
3,641,306 A *  2/1972 Oakes .................. B23K 11/26
219/113
(Continued)

FOREIGN PATENT DOCUMENTS

JP        H05-042375 A      2/1993

*Primary Examiner* — David Angwin
*Assistant Examiner* — Justin Dodson
(74) *Attorney, Agent, or Firm* — Crowell & Moring LLP (57) ABSTRACT

An economical capacitor-type welding device and capacitor-type welding method that have a small power loss, that can be made compact, and that reliably control a charging circuit without being affected by the inductance of a charging path. In an exemplary capacitor-type welding device and an exemplary capacitor-type welding method of the invention, a bypass switching element having a forward-blocking function is connected in parallel to output terminals of a charging circuit, and the bypass switching element is brought into a conduction state to allow a backflow current, which is caused to flow by a magnetic energy stored in the inductance of a primary winding or an inductor included in the charging path, to bypass the charging circuit. A discharge switching element is brought into a conduction state after the bypass switching element enters the non-conduction state and recovers the forward-blocking function.

18 Claims, 4 Drawing Sheets

(51) Int. Cl.
*B23K 11/24* (2006.01)
*H02M 1/32* (2007.01)
*B23K 101/18* (2006.01)

(58) Field of Classification Search
USPC ............... 219/108, 110, 111, 112, 113, 116; 361/225
See application file for complete search history.

(56) References Cited

U.S. PATENT DOCUMENTS

2003/0201262 A1* 10/2003 Katooka .............. B23K 9/1062 219/130.51
2011/0211292 A1* 9/2011 Tyler ........................ H05C 1/04 361/225

* cited by examiner

CAPACITOR-TYPE WELDING DEVICE AND CAPACITOR-TYPE WELDING METHOD

TECHNICAL FIELD

The present invention relates to a capacitor type welding device (capacitive welding apparatus) and a capacitor type welding method that weld an object (or objects) to be welded by discharging an energy, which is stored in a welding capacitor using a charging circuit, between welding electrodes in a short time via a welding transformer.

BACKGROUND ART

A capacitor type welding device is advantageous in that the capacitor type welding device does not need a large facility for receiving electric power, if compared to a general AC welding device, because the capacitor type welding device stores welding electric power in a welding capacitor in a longer time than a discharge time and discharges the electricity at once. The capacitor type welding device is also advantageous in that welding marks (burning) are hardly created at welded portions and distortions are small because the object(s) to be welded is (are) only superheated to a small extent. Because of such advantages, the capacitor type welding device is employed for any size of industrial facility from small to large industrial facilities.

In general, the capacitor type welding device uses a capacitor bank as a welding capacitor, which includes a plurality of parallel-connected electrolytic capacitors. Because the welding method using the capacitor type welding device is well known, the welding method is not described here in detail. In brief, an object (objects) to be welded is (are) placed between welding electrodes, the distance between the welding electrodes is made smaller, and a predetermined welding pressure is exerted on the object(s) by the welding electrodes. The welding capacitor is charged while such mechanical operation is being performed.

When the charged voltage of the welding capacitor rises to a predetermined value, the charging circuit is turned off to interrupt (discontinue) the charging process. While the welding electrodes are applying the welding pressure on the object(s) to be welded, a discharge switch is turned on. As a result, a steeply increasing pulse current flows in the primary winding of the welding transformer. The turn of the secondary winding of the welding transformer may be one or the like, which is significantly smaller than the turn of the primary winding. Thus, a pulse welding current that is significantly larger than the current of the primary winding flows in the secondary winding and the object(s) to be welded, so that the welding is performed with such welding current and a welding product is obtained in a short time.

In general, the capacitor type welding device uses a welding transformer, and connects the welding capacitor in series to the primary winding of the welding transformer in order to avoid the bias excitation of the welding transformer. Both the charging current to the welding capacitor and the discharge current in the opposite direction flow in the primary winding of the welding transformer. Apart from the bias excitation of the welding transformer, a certain type of capacitor type welding device connects an inductor between the charting circuit and the welding capacitor to improve a power factor such that the charging current does not flow through the primary winding of the welding transformer but the charging current flows in the welding capacitor through the inductor from the charging current. Such configuration can charge the welding capacitor at a high efficiency in a stable manner. The welding transformer and the inductor may have the inductances that are suitable for an intended use. A route for the charging current to flow in the welding capacitor from the charging circuit (hereinafter, referred to as "charging path") also includes a floating (stray) inductance, which is present in the charging route, other than to the above-mentioned inductance.

The charging circuit may be a single-phase or a three-phase hybrid bridge full wave rectifier circuit, which includes thyristors and rectifier diodes connected in a bridge structure, if a certain charging method is employed for charging the welding capacitor or for other reasons. The charging current is controlled by controlling a conduction angle of the thyristor(s) (see, for example, Patent Literature 1). When the thyristors are used in the charging circuit and the welding transformer or the above-mentioned inductor(s) is (are) provided on the charging path, a magnetic energy is stored in their inductances and/or the floating inductance (hereinafter, referred to as "inductance of the charging path"). A current that is caused to flow by this magnetic energy (hereinafter, referred to as "backflow current" or "return current") adversely affects the charging circuit as will be described below.

In a common welding process, a large welding current is often needed. This is also true to the capacitor type welding device. In case of a highly efficient capacitor type welding device that includes the hybrid bridge full wave rectifier circuit as the charging circuit, the respective thyristors of the hybrid bridge full wave rectifier circuit are phase controlled such that the switching of the thyristors is carried out at certain cycles (e.g., more than ten cycles and less than several tens of cycles, or even more) to charge the welding capacitor. For example, when constant current control is performed, a generally constant large charging current flows to the welding capacitor from the charging circuit through the primary winding of the welding transformer or the inductor every time the respective thyristors are brought into the conduction state, until the charged voltage of the welding capacitor reaches a predetermined value. At the same time, a magnetic energy is stored in the inductance of the charging path.

The backflow current which is caused to flow due to the magnetic energy flows in the same path as the charging path and therefore the backflow current flows through the hybrid bridge full wave rectifier circuit, through which the charging current flows. Particularly in case of a three-phase hybrid bridge full wave rectifier circuit, because a non-conduction time between the thyristors, which are brought into the conduction state in turn (successively), is short, the backflow current which flows in a certain thyristor due to the magnetic energy may not become smaller than a holding current even if the phase control signal drops to the zero level from a high level. In this case, this thyristor keeps the conduction state without recovering its forward-blocking function.

Particularly in case of the capacitor type welding device, the charging current flows in the welding transformer or the inductor in the predetermined direction for certain cycles (more than ten cycles and less than several tens of cycles, or even more) as described above, and therefore the magnetic energy stored in the inductance(s) of the welding transformer or the inductor may gradually increase. If this occurs, the backflow current due to the magnetic energy may become also large, a certain thyristor in the hybrid bridge full wave rectifier circuit may not be able to become a non-conduction state but keep the conduction state. Then, the desired control of the charging circuit becomes difficult.

LISTING OF REFERENCE(S)

Patent Literature(s)

PATENT LITERATURE 1: Japanese Patent Application Laid-Open Publication No. Hei 05-42375A

SUMMARY OF THE INVENTION

Problems to be Solved

Patent Literature 1 discloses a capacitor type welding device that is equipped with a hybrid bridge full wave rectifier circuit as the charging circuit but does not explicitly describe any influences of the backflow current due to the magnetic energy stored in the charging path inductance, which exists in the charting path. Accordingly, Patent Literature 1 does not describe the disablement of the control to the thyristors in the charging circuit, and does not describe a solution to prevent such disablement.

In view of the foregoing, an object of the present invention is to provide a capacitor type welding device that can prevent the disablement of the control to the thyristors in the charging circuit under the influences of the backflow current, can have a smaller size, can reduce the electric power loss and can decrease a cost, and to provide a control method for such capacitor type welding device. In one embodiment of the present invention, a bypass switching element that has both a backward-blocking function and a controllable forward-blocking function, such as a thyristor or an IGBT (Insulated Gate Bipolar Transistor), is connected across DC output terminals of the charging circuit. The bypass switching element is turned on when the charging circuit performs the charging process. When the bypass switching element recovers its forward-blocking function, i.e., the bypass switching element enters the non-conduction state, the charged electric charge of the welding capacitor is discharged.

According to one embodiment of the present invention, therefore, when the backflow current flows due to the magnetic energy stored in the inductance of the charging path, the bypass switching element causes the backflow current to bypass the charging circuit. Thus, it is possible to prevent the disablement of the control to the thyristors in the charging circuit. In addition, because a large discharge current does not flow in the bypass switching element during the discharging process of the charged electric charge of the welding capacitor when compared to the charging current, the thyristor or IGBT that has a similar (or the same) current capacity to (as) the magnitude of the charging current can be used as the bypass switching element. Thus, the size reduction, the electric power loss reduction, and the cost reduction are achieved.

Solution to the Problems

In order to overcome the above-described problems, one aspect of the present invention provides a capacitor type welding device that includes a charging circuit configured to convert an input AC electric power to a DC electric power and output the DC electric power. The charging circuit has a hybrid bridge full wave rectifier circuit, which has thyristors and rectifier diodes connected in a bridge structure, or a thyristor full wave rectifier circuit, which has thyristors connected in a bridge structure. The capacitor type welding device also includes a welding transformer having a primary winding and a secondary winding. The capacitor type welding device also includes a welding capacitor configured to be charged by a charging current which flows in a charging path from the charging circuit. The charging path includes at least the primary winding or an inductor connected in series to the primary winding. The inductor is provided between the charging circuit and the primary winding. The capacitor type welding device also includes a discharge switching element configured to discharge the charged electric charge of the welding capacitor through the welding transformer to perform the welding when the DC electric power is not supplied to the welding capacitor from the charging circuit. The capacitor type welding device also includes a bypass switching element connected in parallel across output terminals of the charging circuit, and having a forward-blocking function to cause a backflow current to bypass the charging circuit. The backflow current flows due to a magnetic energy stored in an inductance of the primary winding of the charging path or an inductance of the inductor of the charging path. The capacitor type welding device also includes a control circuit configured to bring the bypass switching element into a conduction state when the backflow current flows, and to bring the discharge switching element into the conduction state after the bypass switching element enters a non-conduction state and recovers the forward-blocking function.

In order to overcome the above-described problems, another aspect of the present invention provides a welding method using a capacitor type welding device. The capacitor type welding device includes a charging circuit configured to convert an input AC electric power to a DC electric power and output the DC electric power. The charging circuit has a hybrid bridge full wave rectifier circuit, which has thyristors and rectifier diodes connected in a bridge structure, or a thyristor full wave rectifier circuit, which has thyristors connected in a bridge structure. The capacitor type welding device also includes a welding transformer having a primary winding and a secondary winding. The capacitor type welding device also includes a welding capacitor configured to be charged by a charging current which flows in a charging path from the charging circuit. The charging path includes at least the primary winding or an inductor connected in series to the primary winding. The inductor is provided between the charging circuit and the primary winding. The capacitor type welding device also includes a discharge switching element configured to discharge the charged electric charge of the welding capacitor through the welding transformer to perform the welding when the DC electric power is not supplied to the welding capacitor from the charging circuit. The welding method includes preparing a bypass switching element that is connected in parallel across output terminals of the charging circuit and has a forward-blocking function. The welding method also includes bringing the bypass switching element into a conduction state to cause a backflow current to bypass the charging circuit. The backflow current is caused to flow by a magnetic energy stored in an inductance of the primary winding of the charging path or an inductance of the inductor of the charging path. The welding method also includes bringing the discharge switching element into the conduction state after the bypass switching element enters a non-conduction state and recovers the forward-blocking function.

Advantageous Effects of the Invention

The capacitor type welding device and the control method therefor according to the present invention can prevent the disablement of the control to the thyristors in the charging circuit under the influences of the backflow current, achieve the downscaling, reduce the electric power loss, and attain the cost reduction.

DETAILED DESCRIPTION OF THE INVENTION

The capacitor type welding device and the capacitor type welding method according to one aspect of the present invention allow the backflow current, which is caused to flow due to the magnetic energy accumulated in the inductance of the charging path, to flow in the bypass route such that the backflow current does not substantially flow in the charging circuit while the welding capacitor is being charged. When the charged electric charge of the welding capacitor is discharged, the capacitor type welding device and the capacitor type welding method prevent the discharge current, which flows through the primary winding of the welding transformer, from flowing in the bypass route.

Embodiments of the present invention will be described with reference to the accompanying drawings, but the present invention is not limited to the illustrated embodiments. Other embodiments and modifications are encompassed by the scope of the invention as long as they reside in the spirit and scope of the invention. The term "welding" or "weld" in this specification includes not only the welding that melts two metals and forms a nugget with the heat generated at the welded part, but also a diffused junction that induces a plastic flow of two metals and joins the two metals with the heat generated at the welded part. In the specification and the drawings, the same reference numerals indicate the same components. A pressing mechanism for applying a welding pressure (forging pressure) to allow the welding current to flow between the welding electrodes, a drive mechanism for driving (moving) the welding electrodes, various types of detecting circuits and the like are not shown in the drawings because they are not particularly needed to describe the operation (function) of the embodiments of the present invention.

First Embodiment

Figure 1:
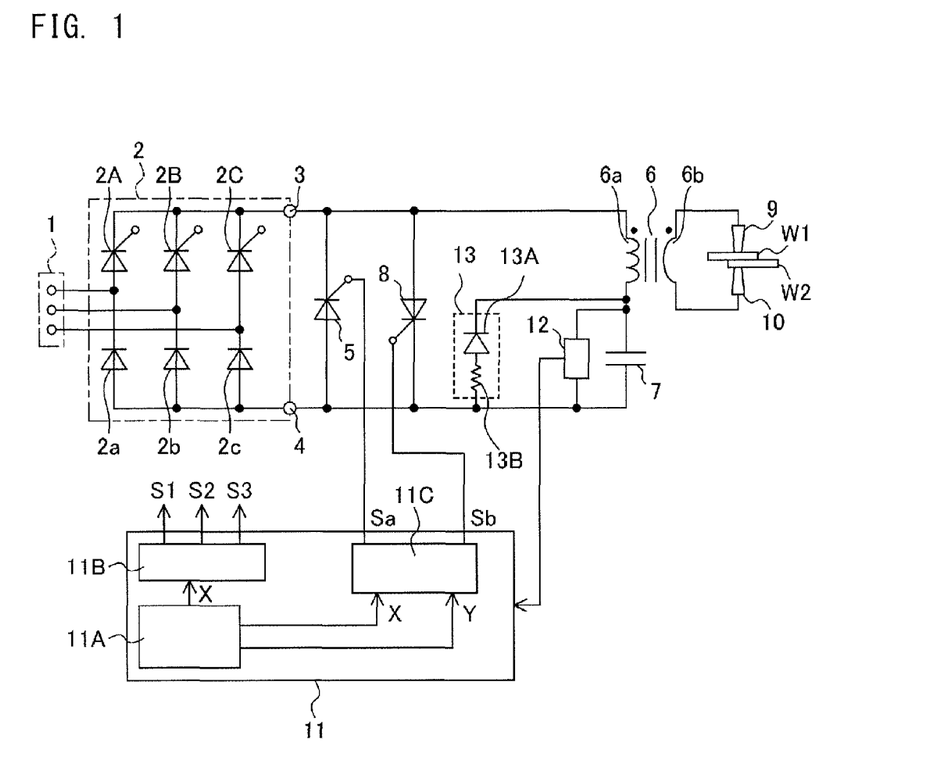
FIG. 1 is a view useful to describe a capacitor type welding device and a control method therefor according to a first embodiment of the present invention.

Referring to FIGS. 1 and 2, the capacitor type welding device and the capacitor type welding method according to the first embodiment of the present invention will be described. The capacitor type welding device shown in FIG. 1 includes a three-phase AC input terminal 1, a charging circuit 2, DC output terminals 3 and 4 of the charging circuit 2, a bypass switching element 5 connected across the DC output terminals 3 and 4, a welding transformer 6 having a primary winding 6a and a secondary winding 6b, a welding capacitor 7, a discharge switch 8, a first welding electrode 9, a second welding electrode 10, and a control circuit 11. The first and second welding electrodes 9 and 10 are connected to the secondary winding 6b.

The control circuit 11 sends control signals S1, S2 and S3 to the charging circuit 2, sends a first drive signal Sa to the bypass switching element 5, and sends a second drive signal Sb to the discharge switch 8. A voltage detecting circuit (voltage detector) 12 detects a charged voltage of the welding capacitor 7, and sends a detection value to the control circuit 11. It should be noted that a one-way electric power consumption circuit 13, which is used to discharge a reverse voltage charged in the welding capacitor 7, is connected in parallel to the welding capacitor in FIG. 1.

Reference signs W1 and W2 designate objects to be welded, which are placed between the first welding electrode 9 and the second welding electrode 10, and made from various kinds of steel material or a highly conductive metallic material or the like such as copper and aluminum. The objects W1 and W2 are welded as the pulse welding current flows in the objects W1 and W2 while the objects W1 and W2 are in the pressed condition. In this specification, the objects to be welded, through which the welding current flows and which have undergone the welding process, are collectively referred to as a welding product. In the capacitor type welding device shown in FIG. 1, the charging current and the discharge current of the welding capacitor 7 flow in the primary winding 6a of the welding transformer 6 in opposite directions, and therefore the capacitor type welding device is advantageous in that the bias excitation is difficult to take place in the welding transformer 6.

The charging circuit 2 is a circuit for charging the welding capacitor 7. The charging circuit 2 illustrated in FIG. 1 is a three-phase hybrid bridge full wave rectifier circuit that has thyristors 2A, 2B and 2C and rectifier diodes 2a, 2b and 2c connected in a bridge structure. Although not shown, the charging circuit 2 may be a three-phase thyristor full wave rectifier circuit which has thyristors connected in a bridge structure, without using the rectifier diodes. If the input power source is a single-phase alternating current, the charging circuit 2 may be a single-phase hybrid bridge full wave rectifier circuit which has thyristors and rectifier diodes connected in a bridge structure, or a single-phase thyristor full wave rectifier circuit which has thyristors connected in a bridge structure and has no rectifier diodes, although these configurations are not shown. The thyristors 2A, 2B and 2C of the charging circuit 2 are controlled by the phase control signals S1, S2 and S3 from the control circuit 11 such that the conduction state and the non-conduction state are repeated successively. In this embodiment, the charging process is the process for the charging circuit 2 to convert the AC electric power at the AC input terminal 1 into the DC electric power and supply the DC electric power between the DC output terminals 3 and 4 such that the charging current flows in the welding capacitor 7.

A cathode of the bypass switching element 5 is coupled to the DC output terminal 3 of the charging circuit 2, and an anode of the bypass switching element 5 is coupled to the DC output terminal 4. The bypass switching element 5 is connected in parallel to the charging circuit 2. When the charging circuit 2 carries out the charging process, the bypass switching element 5 is brought into the conduction state by the first drive signal Sa from the control circuit 11, and causes the backflow current, which flows due to the magnetic energy stored in the inductance of the charging path (will be described later) to bypass the charging circuit 2. It should be noted that when the electric charge accumulated in the welding capacitor 7 is discharged and the discharge current flows, the bypass switching element 5 is controlled to be in the non-conduction state.

The bypass switching element 5 recovers the forward-blocking function and enters the non-conduction state when the first drive signal Sa drops to the zero level from a high level, i.e., when the first drive signal Sa vanishes and the backflow current flowing through the bypass switching element 5 becomes smaller than the holding current. In each embodiment of the invention, a thyristor is used as the bypass switching element 5, and therefore the bypass switching element is referred to as a bypass thyristor 5 in the following description. It should be noted that a semiconductor switch such as an IGBT and a transistor may be used as the bypass switching element 5 other than the thyristor, or a one-way switch which has a mechanical switch and a diode connected in series to each other may be used as the bypass switching element 5.

A series circuit, which is constituted by the primary winding 6a of the welding transformer 6 and the welding capacitor 7 connected in series to each other, is connected in parallel between the DC output terminals 3 and 4 of the charging circuit 2. A common transformer may be used as the welding transformer 6, with the turn of the secondary winding 6b being one or the like and the turn of the primary winding 6a being greater than the turn of the secondary winding 6b, and therefore the welding transformer 6 is not described in detail. In general, the welding transformer has a greater inductance than a floating (stray) inductance of the charging path, through which the charging current flows. The first and second welding electrodes 9 and 10 are connected to the opposite ends of the secondary winding 6b of the welding transformer 6, respectively. Because the first and second welding electrodes 9 and 10 may be common electrodes, the description of the first and second electrodes 9 and 10 is omitted. The welding capacitor 7 may be a capacitor block, which has a plurality of polarized electrolytic capacitors connected in parallel, or a capacitor bank, which includes a plurality of capacitor blocks connected in parallel. Alternatively, the welding capacitor 7 may be a capacitor block, which has a plurality of non-polar (bipolar) capacitors, such as polypropylene film capacitors, connected in parallel, or a capacitor bank, which includes a plurality of such capacitor blocks connected in parallel.

The discharge switch 8 is connected in parallel to a series circuit, which is constituted by the primary winding 6a of the welding transformer 6 and the welding capacitor 7 connected to each other in series. As the discharge switch 8 is turned on, a discharge circuit is established to discharge the charged electric charge of the welding capacitor 7 in a short time. Because a thyristor is used as the discharge switch 8 in each embodiment of the present invention, the discharge switch is referred to as the discharge thyristor 8 in the following description. An anode of the discharge thyristor 8 is coupled to one of the DC output terminals 3 of the charging circuit 2, and a cathode of the discharge thyristor 8 is coupled to the other DC output terminal 4 of the charging circuit 2. The discharge thyristor 8 is kept in the non-conduction state while the charging circuit 2 is charging the welding capacitor 7.

Figure 2A:
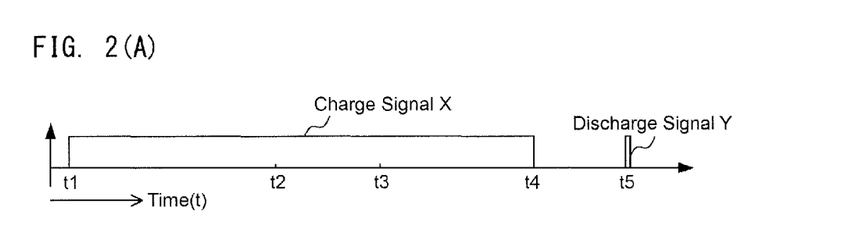
FIG. 2(A) is a waveform diagram of a charge signal and a discharge signal generated by the capacitor type welding device and the control method therefor according to the first embodiment.
Figure 2B:
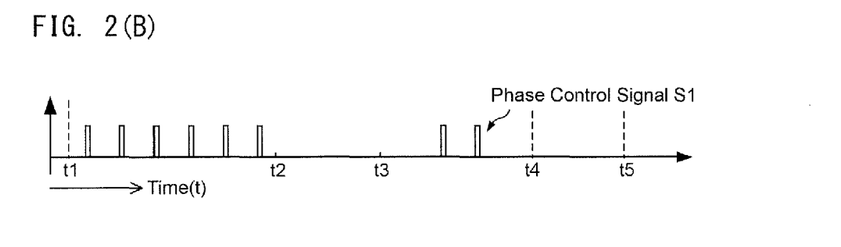
FIG. 2(B) is a waveform diagram of a first phase control signal generated by the capacitor type welding device and the control method therefor according to the first embodiment.
Figure 2C:
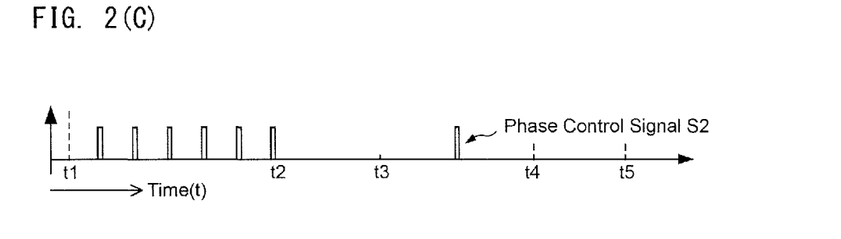
FIG. 2(C) is a waveform diagram of a second phase control signal generated by the capacitor type welding device and the control method therefor according to the first embodiment.
Figure 2D:
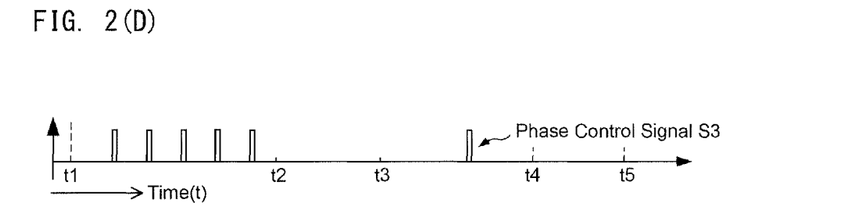
FIG. 2(D) is a waveform diagram of a third phase control signal generated by the capacitor type welding device and the control method therefor according to the first embodiment.
Figure 2E:
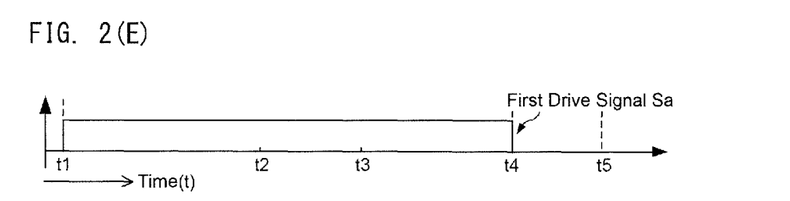
FIG. 2(E) is a waveform diagram of a first drive signal generated by the capacitor type welding device and the control method therefor according to the first embodiment.
Figure 2F:
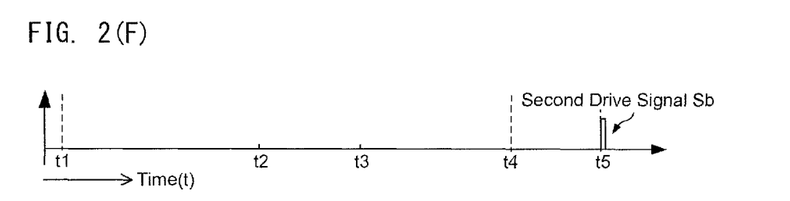
FIG. 2(F) is a waveform diagram of a second drive signal generated by the capacitor type welding device and the control method therefor according to the first embodiment.

The control circuit 11 has a sequencer 11A, a phase control signal generating circuit 11B, a drive circuit 11C, and other components. The sequencer 11A generates a charge signal X and a discharge signal Y, both of which having predetermined time widths respectively as shown in FIG. 2(A). The phase control signal generating circuit 11B receives the charge signal X from the sequencer 11A, and a detected voltage signal Vc, which has a value corresponding to a value of the charged voltage of the welding capacitor 7, from the voltage detecting circuit 12, and then operates to generate the phase control signals S1, S2 and S3 as shown in FIGS. 2(B), 2(C) and 2(D), respectively. The phase control signals S1, S2 and S3 are introduced to the gates of the thyristors 2A, 2B and 2C of the charging circuit 2, respectively. Upon receiving the charge signal X and the discharge signal Y from the sequencer 11A, the drive circuit 11C sends the first drive signal Sa, which is shown in FIG. 2(E) and synchronized with the charge signal X, to the gate of the bypass switching element 5, and sends the second drive signal Sb, which is shown in FIG. 2(F) and synchronized with the discharge signal Y, to the gate of the discharge switch 8.

The time interval between the discharge signal and a next discharge signal is substantially equal to the time from the removal of the welding product from between the first welding electrode 9 and the second welding electrode 10 upon finishing the welding (i.e., the previous discharge signal), to the placing and desired positioning of new objects to be welded W1 and W2 between the first welding electrode 9 and the second welding electrode 10. In an actual welding process, a considerably long time may be necessary to place and position the objects to be welded W1 and W2 between the first welding electrode 9 and the second welding electrode 10 in a desired manner, compared to the charging time needed to charge the welding capacitor 7 to a predetermined voltage value. If such considerably long time is necessary, the charged voltage of the welding capacitor 7 may drop due to self-discharge depending upon the charging start time of the charging circuit 2. Then, supplemental (additional) charging may become necessary. In the first embodiment, the time width of the charge signal X is decided on the assumption that the supplemental charging is carried out.

The first drive signal Sa sent to the gate of the bypass thyristor 5 becomes the zero level in synchronization with the charge signal X, and the bypass thyristor 5 enters a non-conduction state as the backflow current flowing in the bypass switching element 5 becomes smaller than the holding current thereof. After the end of the charging signal X, therefore, time for recovering the forward-blocking function of the bypass thyristor 5 should be taken into account. As shown in FIG. 2, for example, the charge signal X ends at the time t4, which is approximately several hundred milliseconds earlier than the time t5, at which the discharge signal Y is generated. In other words, the control circuit 11 controls the non-conduction time of the bypass thyristor 5 such that substantially no discharge current flows in the bypass thyristor 5 when the electric charge of the welding capacitor 7 is discharged.

In one exemplary circuitry of the one-way electric power consumption circuit 13, as shown in FIG. 1, a series circuit, which includes a diode 13A arranged in a direction not to pass the charging current and a resistor 13B, is connected in parallel to the welding capacitor 7. The charged electric charge stored in the welding capacitor 7 by the charging process of the charging circuit 2 is discharged through the primary winding 6a of the welding transformer 6 and the discharge thyristor 8 as the discharge thyristor 8 is brought into the conduction state. At the same time, resonance takes place between the capacitance of the welding capacitor 7 and the inductance of the discharge path, including the inductance of the primary winding 6a of the welding transformer 6, and the voltage polarity of the welding capacitor 7 is reversed after the half period of the resonance elapses.

The electric charge having the reversed polarity (hereinafter referred to as "residual electric charge") has the positive polarity on the DC output terminal 4 side of the charging circuit 2 and the negative polarity on the DC output terminal 3 side. The residual electric charge is consumed by the one-way electric power consumption circuit 13. When the residual electric charge of the welding capacitor 7 is consumed by the one-way electric power consumption circuit 13, the voltage of the welding capacitor 7 can have a sufficiently low voltage as the next charging for the welding capacitor 7 starts. In addition, when the residual electric charge of the welding capacitor 7 is consumed by the one-way electric power consumption circuit 13, the discharge current of the residual electric charge upon the next conduction of the charging circuit 2 and the bypass switching element 5 does not substantially flow in the charging circuit 2 and the bypass switching element 5.

Referring now to FIGS. 1 and 2, the operation of the capacitor type welding device of the first embodiment will be described. By pressing a welding start button (not shown), the sequencer 11A of the control circuit 11 starts sending the charge signal X, which is described above, to the phase control signal generating circuit 11B and the drive circuit 11C at the time t1, as shown in FIG. 2(G). Upon receiving the charge signal X, the phase control signal generating circuit 11B and the drive circuit 11C start the respective operations. In the first embodiment, the phase control signal generating circuit 11B sends the phase control signals S1, S2 and S3 to the gates of the thyristors 2A, 2B and 2C of the charging circuit 2 such that the controlled conduction angles of the phase control signals S1, S2 and S3 cause the charging current, which charges the welding capacitor 7, to have a substantially constant (predetermined) value. As the thyristors 2A, 2B and 2C successively repeat the conduction state and non-conduction state with the phase control signals S1, S2 and S3, the charging circuit 2 performs the charging process to cause a substantially constant charging current to flow in the welding capacitor 7 for constant-current charging of the welding capacitor 7. It should be noted that the control method for the thyristors 2A, 2B and 2C may be a conventional method, and the control method to be used in the embodiment of the present invention is not limited to a particular method.

Immediately after the drive circuit 11C receives the charge signal X, the drive circuit 11C sends the first drive signal Sa to the bypass thyristor 5 to bring the bypass thyristor 5 into a standby condition for conduction. It is preferred that the bypass thyristor 5 is maintained in the standby condition for conduction while the charging circuit 2 is carrying out the charging process. By maintaining the bypass thyristor 5 in the standby condition for conduction, it is possible to reliably bring the bypass thyristor 5 into the conduction state when the backflow current flows. The charging current generated from the charging circuit 2 flows through the DC output terminal 3, the primary winding 6a of the welding transformer 6, the welding capacitor 7 and the DC output terminal 4 to charge the welding capacitor 7.

As described above, the charging path inductance including the inductance of the welding transformer 6 and the floating inductance exists on the charging path. Thus, the magnetic energy is accumulated in the charging path inductance every time the thyristors 2A, 2B and 2C of the charging circuit 2 enter the conduction state in the respective cycles and the charging current flows in the primary winding 6a. This magnetic energy is released through the welding capacitor 7 and the bypass thyristor 5 so that the backflow current flows, when the thyristors 2A, 2B and 2C of the charging circuit 2 are in the non-conduction state in the respective cycles.

The forward voltage drop of the bypass thyristor 5 is smaller than the sum of the forward voltage drop of the thyristor of the charging circuit 2, which enters the conduction state when establishing the charging path, and the forward voltage drop of the diode (e.g., the sum of the forward voltage drop of the thyristor 2A and the forward voltage drop of the rectifier diode 2b or 2c). The backflow current, therefore, substantially flows in the bypass thyristor 5, which has a low(er) forward voltage drop or which has a low(er) impedance, and bypasses the charging circuit 2. As a result, the phase control signals S1, S2 and S3 drop to the zero level from the high level, and then the current flowing in the thyristors 2A, 2B and 2C of the charging circuit 2 becomes lower than the holding current thereof. Thus, the thyristors 2A, 2B and 2C enter the non-conduction state.

For example, if the bypass thyristor 5 is not connected, the following shortcomings could possibly occur. In the early stage of the charging process, the charged voltage of the charging capacitor 7 is low and the charging current having a high peak value flows. Thus, the control is carried out such that the conduction angles of the thyristors 2A, 2B and 2C are small in the respective cycles, and the non-conduction time is long. Accordingly, when the inductance of the charging path is relatively small and the magnetic energy is relatively small, no control problems occur if the thyristor that is in the conduction state until just now enters the non-conduction state after the release of the magnetic energy before the next thyristor that should subsequently enter the conduction state enters the conduction state.

However, as the charging process of the charging capacitor 7 proceeds, the conduction angles of the thyristors 2A, 2B and 2C become large(r) to maintain the charging current to the constant value. In other words, the pulse widths of the phase control signals S1, S2 and S3 become large(r), and the non-conduction times of the thyristors 2A, 2B and 2C in the respective cycles become short(er). As the non-conduction time becomes short(er), the next thyristor enters the conduction state while a backflow current greater than the holding current flows in the thyristor which is in the conduction state until just now, i.e., the next thyristor enters the conduction state while the thyristor is not yet in the non-conduction state. If this occurs, the current flowing in the thyristor does not become smaller than the holding current, and therefore the thyristor maintains the conduction state and becomes uncontrollable.

One method for reducing the influences of the backflow current due to the magnetic energy stored in the inductance of the charging path is connecting a bypass diode in parallel across the output terminals of the charging circuit, i.e., connecting the bypass diode, instead of the bypass thyristor 5, in FIG. 1. By connecting the bypass diode in parallel across the output terminals of the charging circuit, the backflow current which is caused to flow due to the magnetic energy stored in the inductance of the charging path can flow in the bypass diode for bypassing. If the backflow current caused to flow due to the magnetic energy flows in the diode for bypassing in the above-described manner, the backflow current does not substantially flow through the thyristor(s) of the charging circuit. Thus, when the phase control signal(s) for phase controlling the thyristor(s) decreases from the high level to the zero level, the thyristor(s) becomes the non-conduction state, and it is possible to control the hybrid bridge full wave rectifier circuit and the like.

However, because the capacitor type welding device discharges the charged electric charge of the welding capacitor in a short time, means for causing the pulse discharge current, which is larger than the charging current, to flow in the primary winding of the welding transformer is needed. As described above, if the bypass diode is connected in parallel across the output terminals of the charging circuit, the backflow current does not flow in the charging circuit and bypasses the charging circuit, i.e., the backflow current flows in the bypass diode. However, because the bypass diode does not have the forward-blocking function, most of the residual charge whose polarity is positive at the DC output terminal 4 of the charging circuit 2 and negative at the DC output terminal 3 is discharged through the bypass diode which has a small(er) impedance rather than the one-way electric power consumption circuit 13 which has a large(r) impedance.

As a result, another problem occurs, i.e., a large discharge current due to the discharge of the residual electric charge of the welding capacitor 7 flows in the bypass diode during the welding process. To avoid this problem, a diode having a large current capacity, which can pass the large discharge current, should be used. This necessitates a large heat radiation mechanism for heat radiation from the diode. This is inferior in terms of cost, increases the device size, and is not preferable in terms of environment.

The embodiment of the present invention, on the contrary, connects the bypass thyristor 5 in parallel between (across) the DC output terminals 3 and 4 of the charging circuit 2 to establish the bypass route, and the bypass thyristor 5 has a smaller forward voltage drop than the forward voltage drop across the opposite ends of the charging circuit 2. Therefore, the backflow current caused to flow due to the release of the magnetic energy stored in the inductance of the charging path flows in the bypass thyristor 5. When the bypass thyristor 5 is in the conduction state, a voltage which is equal to the forward voltage drop of the bypass thyristor 5 is applied across the opposite ends of the charging circuit 2. When this voltage application causes the phase control signals S1, S2 and S3 to decrease to the zero level, the current flowing in the thyristors 2A, 2B and 2C of the charging circuit 2 decreases to or below the holding current and therefore the thyristors 2A, 2B and 2C are surely brought into the non-conduction state. In addition, the bypass thyristor 5 is brought into the non-conduction state during the welding process, a large discharge current does not flow due to the residual electric charge of the welding capacitor 7.

Now, the charging process for the above-mentioned supplemental charging will be described in detail. It should be assumed here that the charging circuit 2 sends the controlled charging current to the welding capacitor 7, and the charged voltage of the welding capacitor 7 reaches a first predetermined voltage V1, which is a voltage necessary to perform a desired welding process, at the time t2 in FIG. 2(G). The voltage detecting circuit 12 sends a detection voltage Vc, which is equal to the first predetermined detection voltage corresponding to the first predetermined voltage V1, to the phase control signal generating circuit 11B of the control circuit 11 at the time t2, and the phase control signal generating circuit 11B interrupts (stops) the outputting of the phase control signals S1, S2 and S3. Accordingly, the charging circuit 2 interrupts the charging process, and therefore the main charging process to the welding capacitor 7 under the constant current control ends.

Figure 2G:
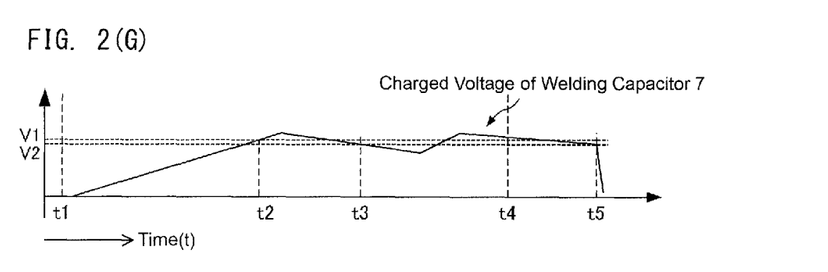
FIG. 2(G) is a waveform diagram of a charging voltage generated by the capacitor type welding device and the control method therefor according to the first embodiment.

Although this condition is maintained, the charged voltage of the welding capacitor 7, in general, gradually decreases over time due to self-discharge. If the charged voltage of the welding capacitor 7 decreases to a second predetermined voltage V2, which is a predetermined value smaller than the first predetermined voltage V1, at the time t3, then the voltage detecting circuit 12 sends a voltage detection signal Vc, which corresponds to the second predetermined voltage V2, to the phase control signal generating circuit 11B. Accordingly, the phase control signal generating circuit 11B sends the phase control signals S1, S2 and S3 to the thyristors 2A, 2B and 2C again, and the charging circuit 2 starts the supplemental charging. During the supplemental charging, each of the phase control signals S1, S2 and S3 may be a control signal having a predetermined constant width.

When the supplemental charging of the charging circuit 2 causes the charged voltage of the welding capacitor 7 to reach the first predetermined voltage V1 again, the phase control signal generating circuit 11B stops generating the phase control signals S1, S2 and S3 to stop the supplemental charging. Subsequently, the charge signal X terminates at the time t4. At the same time, the drive circuit 11C stops generating the first drive signal Sa. The first drive signal Sa rises together with the rising of the charge signal X, and falls together with the falling of the charge signal X. In other words, the first drive signal Sa synchronizes with the charge signal X.

Even if a magnetic energy is stored in the inductance of the charging path due to the charging process during the supplemental charging, the first drive signal Sa maintains the high level in FIG. 2(E) up to the time t4 (until the charge signal X terminates), and therefore the bypass thyristor 5 enters the conduction state as the above-mentioned backflow current flows. As a result, the backflow current due to the magnetic energy stored in the inductance of the charging path during the supplemental charging also flows in the bypass thyristor 5. The bypass thyristor 5 enters the non-conduction state when the backflow current flowing in the bypass thyristor 5 becomes smaller than the holding current of the bypass thyristor 5.

After the bypass thyristor 5 enters the non-conduction state in the above-described manner, i.e., after the bypass thyristor 5 recovers the forward-blocking function, the drive circuit 11C receives a discharge signal Y from the sequencer 11A at the time t5, and applies the second drive signal Sb on the gate of the discharge thyristor 8. As the discharge thyristor 8 enters the conduction state upon application of the second drive signal Sb, the charged electric charge stored in the welding capacitor 7 is discharged through the primary winding 6a of the welding transformer 6 and the discharge thyristor 8. Accordingly, a large pulse welding current flows from the secondary winding 6b of the welding transformer 6 into the objects to be welded W1 and W2 for welding. In the meantime, the resonance takes place between the capacitance of the welding capacitor 7 and the inductance of the charging path. After the half period of the resonance elapses, the electric charge of the welding capacitor 7 has a reversed polarity, and the residual electric charge which has a negative polarity on the DC output terminal 3 side of the charging circuit 2 and a positive polarity on the DC output terminal 4 side is stored in the welding capacitor 7 as described above, but use of the one-way electric power consumption circuit 13 can release the residual electric charge for electric power consumption as described above.

At the time t5, the thyristors 2A, 2B and 2C and the bypass thyristor 5 are all in the non-conduction state, and the phase control signals S1, S2 and S3 and the first drive signal Sa are not generated. Thus, neither the thyristors 2A, 2B and 2C nor the bypass thyristor 5 enters the conduction state. As such, a large current does not flow in the bypass thyristor 5 during the welding process, and of course a large current does not flow in the charging circuit 2. Therefore, a thyristor which has a current capacity smaller than the discharge current flowing in the primary winding 6a during the welding process, e.g., a current capacity similar to the charging current, may be used as the bypass thyristor 5. As described above, the bypass thyristor 5 is brought into the conduction sate when the backflow current flows, and the discharge thyristor 8 is brought into the conduction state after the bypass switching element 5 enters the non-conduction state and recovers the forward-blocking function. The bypass thyristor 5 having a small current capacity is used by the backflow current to bypass the charging circuit 2, and the problem of the uncontrollable thyristor during the charging process of the charging circuit 2, which is caused by the backflow current, is overcome.

Second Embodiment

Figure 3:
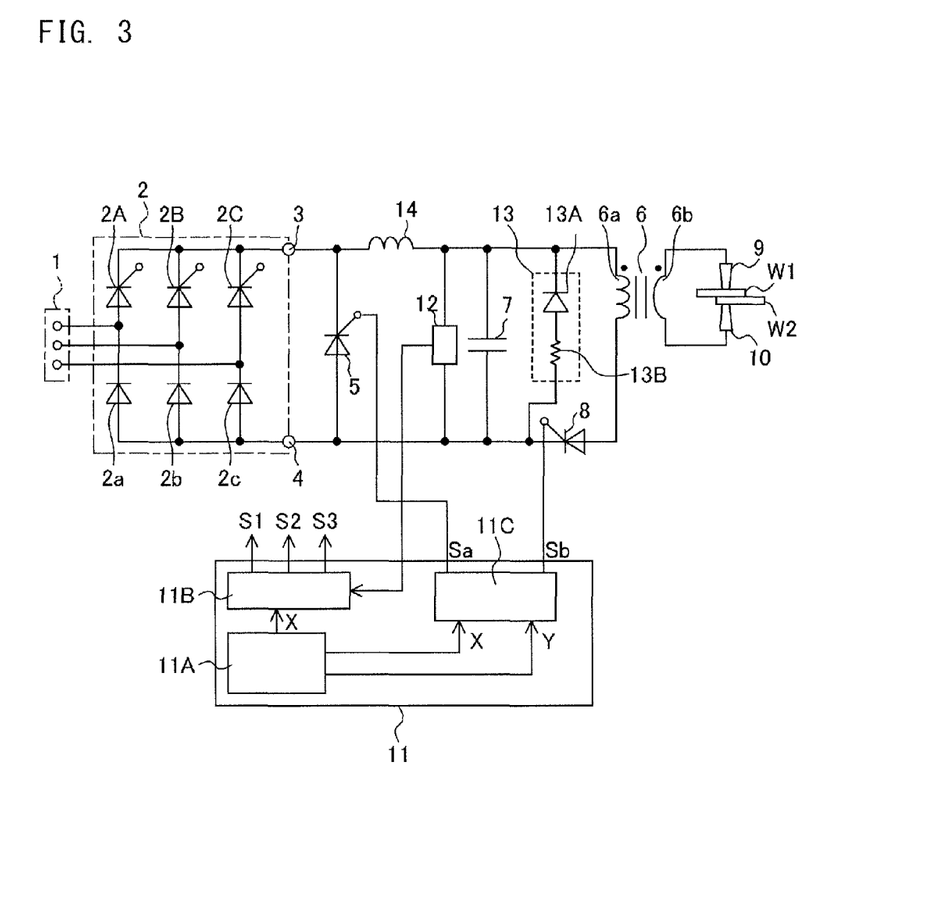
FIG. 3 is a view useful to describe a capacitor type welding device and a control method therefor according to a second embodiment of the present invention.

Referring now to FIG. 3, a capacitor type welding device and a capacitor type welding method according to a second embodiment of the present invention will be described. Major differences in the circuitry of the second embodiment, when compared to the first embodiment, lie in that an inductor 14 for improving a power factor is connected between the charging circuit 2 and the welding capacitor 7 to improve the charging efficiency, the discharge switch 8 is connected in series to the primary winding 6a of the welding transformer 6, and the welding capacitor 7 is connected in parallel to the series circuit constituted by the primary winding 6a and the discharge switch 8.

Similar to the first embodiment, the bypass thyristor 5 is connected in parallel to the charging circuit 2, with the cathode of the bypass thyristor 5 being connected to the DC output terminal 3 of the charging circuit 2 and the anode being connected to the DC output terminal 4 of the charging circuit 2. Similar to the first embodiment, a discharge thyristor is used as the discharge switch 8. If the one-way electric power consumption circuit 13 is used to discharge the residual electric charge of the welding capacitor 7, the circuit 13 is connected in parallel to the welding capacitor 7 as in the first embodiment.

When the charging circuit 2, which has the same circuitry as the charging circuit 2 of the first embodiment, starts the charging process with the phase control signals S1, S2 and S3 from the phase control signal generating circuit 11B, the charging current flows from one of the two DC output terminals 3 of the charging circuit 2 to the other DC output terminal 4 through the inductor 14 and the welding capacitor 7 to charge the welding capacitor 7. Unlike the first embodiment, the charging current does not flow in the primary winding 6a of the welding transformer 6.

As the charging current flows, the phase control signal generating circuit 11B sends the phase control signals S1, S2 and S3 to the charging circuit 2 based on the charge signal X from the sequencer 11A as in the first embodiment. Almost at the same time, the drive circuit 11C applies the first drive signal Sa on the gate of the bypass thyristor 5 to bring the bypass thyristor 5 into the conduction state. At least while the charging circuit 2 carries out the charging process, the conduction state of the bypass thyristor 5 is maintained. Before the discharge thyristor 8 enters the conduction state, the bypass thyristor 5 securely enters the non-conduction state, i.e., the bypass thyristor 5 recovers the forward-blocking function.

In the second embodiment, the charging path has the inductance including the inductance of the inductor 14 and the floating inductance of the charging path, through which the charging current flows. As described above, the thyristors 2A, 2B and 2C of the charging circuit 2 repeat the conduction state and the non-conduction state upon successive application of the phase control signals S1, S2 and S3. Thus, the current flows in the successive cycles of conduction state of the thyristors 2A, 2B and 2C, and the charging current is a direct current. The magnetic energy is stored in the inductance of the charging path during the respective conduction time of the thyristors 2A, 2B and 2C upon receiving the phase control signals S1, S2 and S3.

During the charging time of the welding capacitor 7, the control circuit 11 controls the thyristors 2A, 2B and 2C of the charging circuit 2 and the bypass thyristor 5 in the same manner as the first embodiment. The backflow current flows in the bypass thyristor 5 which has a smaller forward voltage drop than the forward voltage drop of the charging circuit 2. Thus, it is possible to prevent the backflow current from flowing in the thyristors 2A, 2B and 2C. While the bypass thyristor 5 is in the conduction state, the voltage across the DC output terminals 4 and 3 of the charging circuit 2 has the positive polarity at the DC output terminal 4 and the negative polarity at the DC output terminal 3, and is maintained at the same voltage as the forward voltage drop of the bypass thyristor 5. Because the bypass thyristor 5 is used, the current flowing in the thyristors 2A, 2B and 2C after the phase control signals S1, S2 and S3 drop to the zero level becomes smaller than the holding current. Therefore, the thyristors 2A, 2B and 2C securely enter the non-conduction state, and it is possible to prevent the thyristors in the charging circuit 2 from becoming uncontrollable.

Subsequently, the drive circuit 11C applies the second drive signal Sb on the gate of the discharge thyristor 8 based on the discharge signal from the sequencer 11A to bring the discharge thyristor 8 into the conduction state, and discharge the charged electric charge of the welding capacitor 7 through the primary winding 6a of the welding transformer 6 to perform the welding process. In the meantime, the resonance takes place between the capacitor of the welding capacitor 7 and the inductance of the charging path, and the welding capacitor 7 is charged with the reversed polarities such that the voltage polarity is reversed, as described above. Thus, the residual electric charge is stored in the welding capacitor 7, with the DC output terminal 4 having the positive polarity relative to the DC output terminal 3. This residual electric charge is smaller than the charged electric charge.

Because of the resonance between the capacitance of the welding capacitor 7 and the inductance of the primary winding 6a of the welding transformer 6 and the like, a voltage having a polarity opposite the forward direction is applied on the discharge thyristor 8 and therefore the discharge thyristor 8 immediately enters the non-conduction state. It should be noted that if the one-way electric power consumption circuit 13 is connected in parallel to the welding capacitor 7, the one-way electric power consumption circuit 13 can discharge and consume the residual electric charge as described above. When the welding process is carried out, the thyristors 2A, 2B and 2C and the bypass thyristor 5 have already recovered the forward-blocking function. Thus, the current derived from the residual electric charge of the welding capacitor 7 does not flow in the thyristors 2A, 2B and 2C and the bypass thyristor 5 in the forward direction.

In the capacitor type welding device of the second embodiment, therefore, a large current does not flow in the bypass thyristor 5 due to the residual electric charge of the welding capacitor 7. It is thus possible to use, as the bypass thyristor 5, a thyristor having a smaller current capacity than the discharge current. In addition, because the backflow current bypasses the charging circuit 2 during the charging process of the charging circuit 2, one problem is overcome, i.e., the thyristors of the charging circuit 2 do not become uncontrollable due to the backflow current.

Although the first drive signal Sa introduced to the gate of the bypass thyristor 5 is a continuous signal from the time t1 (i.e., start of the charging process in synchronization with the charge signal X) to the time t4, as shown in FIG. 2(E), in the above-described embodiments, other signals may be used as long as the signal can securely bring the bypass thyristor 5 into the conduction state when, at least, the above-described backflow current flows. This is also true for the charging process for the supplemental charging.

Although the thyristors 2A, 2B and 2C of the charging circuit 2 are controlled with the constant current in the above-described embodiments, the conduction angles of the thyristors 2A, 2B and 2C may gradually be increased from a small induction angle such that a large inrush current does not flow during, for example, the early stage of the charging process, and when the charged voltage of the welding capacitor 7 reaches a predetermined value, then the control may be performed with a constant (fixed) conduction angle. Although the above-described embodiments deal with a case where the charged voltage of the welding capacitor decreases due to self-discharge and therefore the supplemental charging becomes necessary depending upon the start time of the charging process of the charging circuit, the supplemental charging may not be carried out if the voltage decrease of the charged voltage of the welding capacitor 7 is small or for other reasons. Alternatively, the predetermined voltage V1 (FIG. 2) may be set to a higher value beforehand by an amount that is expected to decrease in the charged voltage of the welding capacitor 7 due to the self-discharge, such that the supplemental charging becomes unnecessary.

The configurations, structures, numbers, locations, shapes, materials and the like of the respective components and parts of the capacitor type welding device and its charging method according to the embodiments of the present invention are not limited to the above-described examples, but those which may be properly (suitably) selected and employed by a skilled person are also encompassed by the scope of the present invention. Specifically, although the semiconductor switch is represented by the symbol of the thyristor in the above-described embodiments, for example, the semiconductor switch is not limited to such particular electric element, and it is possible to configure the semiconductor switch in the form of an electric circuit that includes a single electric element having the same (similar) performance or function, or a plurality of electric elements having the same (similar) performance or function. All such modifications are encompassed by the scope of the present invention. Likewise, the structural details of the circuit, and the numbers, locations and the like of the respective circuit elements such as the diodes, the resistors and the switching elements may be properly modified or redesigned by a skilled person, and such modifications and redesigning are also encompassed by the scope of the present invention.

REFERENCE SIGNS LIST

1: AC input terminal; 2: Charging circuit; 2A, 2B, 2C: Thyristors; 2a, 2b, 2c: Rectifier diodes; 3, 4: DC output terminals of the charging circuit; 5: Bypass switching element (bypass thyristor); 6: Welding transformer; 6a: Primary winding of the welding transformer 6; 6b: Secondary winding of the welding transformer 6; 7: Welding capacitor; 8: Discharge switch (discharge thyristor); 9: First welding electrode; 10: Second welding electrode; 11: Control circuit; 11A: Sequencer; 11B: Phase control signal generating circuit; 11C: Drive circuit; 12: Voltage detecting circuit; 13: One-way electric power consumption circuit; 13A: Diode, 13B: Resistor; 14: Inductor; W1, W2: Objects to be welded; X: Charge signal; Y: Discharge signal; S1, S2, S3: Phase control signals; Sa: First drive signal; Sb: Second drive signal; V1: First predetermined voltage of the welding capacitor 7; V2: Second predetermined voltage of the welding capacitor 7 (start voltage for the supplemental charging); Vc: Detected value of the charged voltage of the welding capacitor 7.

The invention claimed is:

1. A capacitor type welding device comprising:
a charging circuit configured to receive an AC electric power and convert the AC electric power to a DC electric power, and including a hybrid bridge full wave rectifier circuit, which has thyristors and rectifier diodes connected in a bridge structure, or a thyristor full wave rectifier circuit, which has thyristors connected in a bridge structure;
a welding transformer having a primary winding and a secondary winding;
a welding capacitor configured to be charged by a charging current of the DC electric power which flows in a charging path from the charging circuit, the charging path including at least the primary winding or an inductor connected in series to the primary winding and provided between the charging circuit and the primary winding;
a discharge switching element configured to discharge the welding capacitor charged by the charging current for transferring electric charge from the welding capacitor to the welding transformer to perform welding when the discharge switching element is in a conduction state, the discharge switching element configured to stop discharging the welding capacitor when the discharge switching element is in a non-conduction state;
a bypass switching element connected in parallel to the charging circuit and connected across output terminals of the charging circuit, the bypass switching element having a forward-blocking function not to allow current to flow through the bypass switching element when the bypass switching element is in a non-conduction state, the bypass switching element configured to cause a backflow current, which flows due to a magnetic energy stored in an inductance of the primary winding or the inductor of the charging path, to bypass the charging circuit when the bypass switching element is in a conduction state; and a control circuit including:
  a sequencer configured to generate a charge signal having a time width and generate a discharge signal after the charge signal terminates;
  a control signal generating circuit configured to send a control signal to the thyristors of the charging circuit to cause the charging circuit to perform a charging process while the charge signal is being generated; and
  a drive circuit configured to send a first drive signal to the bypass switching element in synchronization with the charge signal to bring the bypass switching element into the conduction state for causing the backflow current to bypass the charging circuit when the backflow current flows, and send a second drive signal to the discharge switching element in synchronization with the discharge signal to bring the discharge switching element into the conduction state for transferring the electric charge from the welding capacitor to the welding transformer after the bypass switching element enters the non-conduction state when the DC electric power is not supplied to the welding capacitor from the charging circuit.

2. The capacitor type welding device according to claim 1 further comprising a voltage detector configured to detect a charged voltage of the welding capacitor and send a detected voltage to the control circuit, wherein when the detected voltage exceeds a first threshold corresponding to a first voltage of the welding capacitor, the control signal generating circuit of the control circuit stops sending the control signal to the thyristors of the charging circuit, and stops sending the first drive signal to the bypass switching element.

3. The capacitor type welding device according to claim 2, wherein when the charged voltage of the welding capacitor decreases after the detected voltage reaches the first voltage of the welding capacitor, and the detected voltage becomes a second threshold, which is a value lower than the first threshold, then the control signal generating circuit of the control circuit sends the control signal again to the thyristors of the charging circuit to further charge the welding capacitor.

4. The capacitor type welding device according to claim 1 further comprising a one-way electric power consumption circuit connected in parallel to the welding capacitor, wherein the control circuit controls a non-conduction time of the bypass switching element such that a discharge current caused to flow by a discharged electric charge from the welding capacitor is consumed by the one-way electric power consumption circuit for reducing an amount of the discharge current flowing.

5. A welding method using a capacitor type welding device, the capacitor type welding device including:
  a charging circuit configured to receive an AC electric power and convert the AC electric power to a DC electric power, and including a hybrid bridge full wave rectifier circuit, which has thyristors and rectifier diodes connected in a bridge structure, or a thyristor full wave rectifier circuit, which has thyristors connected in a bridge structure;
  a welding transformer having a primary winding and a secondary winding;
  a welding capacitor configured to be charged by a charging current of the DC electric power which flows in a charging path from the charging circuit, the charging path including at least the primary winding or an inductor connected in series to the primary winding and provided between the charging circuit and the primary winding;
  a discharge switching element configured to discharge the welding capacitor charged by the charging circuit for transforming electric charge from the welding capacitor to the welding transformer to perform welding when the discharge switching element is in a conduction state, the discharge switching element configured to stop discharging the welding capacitor when the discharge switching element is in a non-conduction state; and
  a bypass switching element connectable in parallel to the charging circuit and connectable across output terminals of the charging circuit, the bypass switching element having a forward-blocking function not to allow current to flow through the bypass switching element when the bypass switching element is in a non-conduction state, the bypass switching element configured to cause a backflow current, which flows due to a magnetic energy stored in an inductance of the primary winding or the inductor of the charging path, to bypass the charging circuit when the bypass switching element is in a conduction state; and
  a control circuit including:
    a sequencer configured to generate a charge signal having a time width and generate a discharge signal after the charge signal terminates;
    a control signal generating circuit configured to send a control signal to the thyristors of the charging circuit to cause the charging circuit to perform a charging process while the charge signal is being generated; and
    a drive circuit configured to send a first drive signal to the bypass switching element in synchronization with the charge signal to bring the bypass switching element into the conduction state for causing the backflow current to bypass the charging circuit when the backflow current flows, and send a second drive signal to the discharge switching element in synchronization with the discharge signal to bring the discharge switching element into the conduction state for transferring the electric charge from the welding capacitor to the welding transformer after the bypass switching element enters the non-conduction state when the DC electric power is not supplied to the welding capacitor from the charging circuit;

the welding method comprising:
  preparing the bypass switching element to be connected in parallel across output terminals of the charging circuit;
  bringing the bypass switching element into the conduction state to cause the backflow current to bypass the charging circuit, the backflow current being caused to flow by the magnetic energy stored in the inductance of the primary winding or the inductor of the charging path; and
  bringing the discharge switching element into the conduction state after the bypass switching element enters the non-conduction state and recovers the forward-blocking function.

6. The capacitor type welding device according to claim 2 further comprising a one-way electric power consumption circuit connected in parallel to the welding capacitor, wherein the control circuit controls a non-conduction time of the bypass switching element such that a discharge current caused to flow by a discharged electric charge from the welding capacitor is consumed by the one-way electric power consumption circuit for reducing an amount of the discharge current flowing in the bypass switching element.

7. The capacitor type welding device according to claim 3 further comprising a one-way electric power consumption circuit connected in parallel to the welding capacitor, wherein the control circuit controls a non-conduction time of the bypass switching element such that a discharge current caused to flow by a discharged electric charge from the welding capacitor is consumed by the one-way electric power consumption circuit for reducing an amount of the discharge current flowing in the bypass switching element.

8. The capacitor type welding device according to claim 1, wherein the control circuit maintains the bypass switching element in the conduction state while the charging circuit is performing a charging process.

9. The capacitor type welding device according to claim 1, wherein the bypass switching element enters the non-conduction state when the backflow current flowing in the bypass switching element becomes smaller than a holding current of the bypass switching element.

10. The capacitor type welding device according to claim 1, wherein the sequencer generates the discharge signal when a time period elapses after termination of the charge signal.

11. The capacitor type welding device according to claim 1, wherein a voltage which is equal to a forward voltage drop of the bypass switching element is applied across the output terminals of the charging circuit when the bypass switching element is in the conduction state.

12. The capacitor type welding device according to claim 3, wherein the control signal generating circuit of the control circuit stops further charging the welding capacitor when the charged voltage of the welding capacitor returns to the first voltage.

13. The capacitor type welding device according to claim 3, wherein the control circuit maintains the bypass switching element in the conduction state while the welding capacitor is further charged.

14. The capacitor type welding device according to claim 1, wherein the discharge switching element is connected in parallel to the primary winding of the welding transformer and the welding capacitor is connected in series to the primary winding of the welding transformer, or the discharge switching element is connected in series to the primary winding of the welding transformer and the welding capacitor is connected in parallel to the primary welding of the welding transformer.

15. The welding method according to claim 5 further comprising:
generating a charge signal having a predetermined time width;
generating a discharge signal after the charge signal terminates;
sending a control signal to the thyristors of the charging circuit to cause the charging circuit to perform a charging process while the charge signal is being generated;
sending a first drive signal to the bypass switching element in synchronization with the charge signal to bring the bypass switching element into a standby condition for conduction; and
sending a second drive signal to the discharge switching element in synchronization with the discharge signal to bring the discharge switching element into a conduction state.

16. The welding method according to claim 15 further comprising:
detecting a charged voltage of the welding capacitor; and
stopping sending the control signal to the thyristors of the charging circuit and stopping sending the first drive signal to the bypass switching element when the detected voltage exceeds a first predetermined detection voltage corresponding to a first predetermined voltage of the welding capacitor.

17. The welding method according to claim 16 further comprising:
sending the control signal again to the thyristors of the charging circuit to further charge the welding capacitor when the charged voltage of the welding capacitor decreases after the detected voltage reaches the first predetermined voltage of the welding capacitor and the detected voltage becomes a second predetermined detection voltage, which is a predetermined value lower than the first predetermined detection voltage.

18. The welding method according to claim 5 further comprising:
providing a one-way electric power consumption circuit connected in parallel to the welding capacitor; and
controlling a non-conduction time of the bypass switching element such that a discharge current caused to flow by a discharged electric charge from the welding capacitor is consumed by the one-way electric power consumption circuit, and does not substantially flow in the bypass switching element.

* * * * *